Patented Mar. 2, 1926.

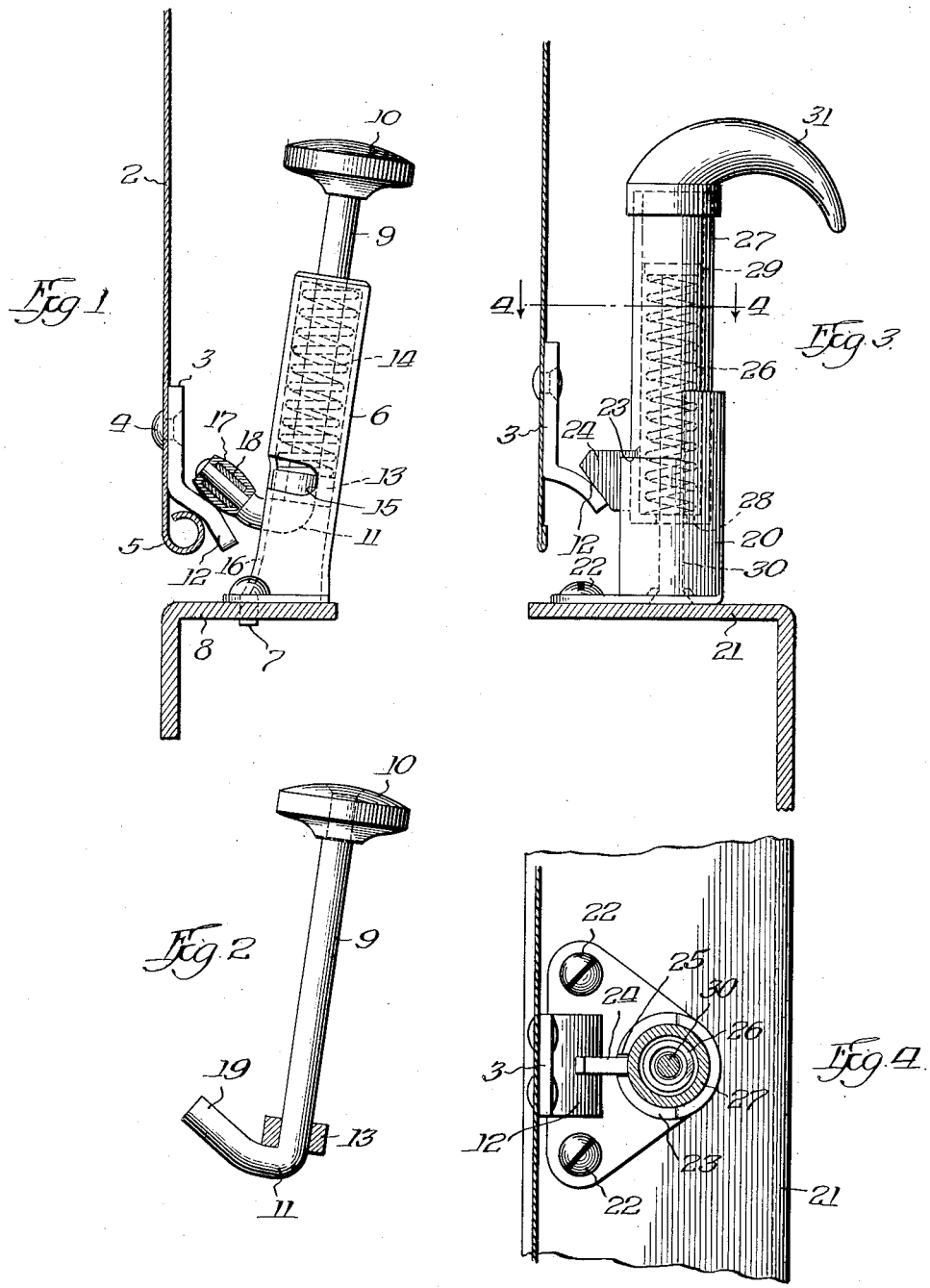

1,575,114

UNITED STATES PATENT OFFICE.

CHARLES B. GILMORE, OF CHICAGO, ILLINOIS, ASSIGNOR TO CHICAGO FORGING & MANUFACTURING COMPANY, OF CHICAGO, ILLINOIS, A CORPORATION OF ILLINOIS.

HOOD LATCH FOR AUTOMOBILES AND THE LIKE.

Application filed November 14, 1924. Serial No. 749,982.

*To all whom it may concern:*

Be it known that I, CHARLES B. GILMORE, a citizen of the United States, residing at Chicago, in the county of Cook and State of Illinois, have invented certain new and useful Improvements in Hood Latches for Automobiles and the like, of which the following is a specification.

This invention relates to closure fasteners or latches and more particularly to a latch or spring fastener for firmly and releasably securing the hood flap of the hood or cover of an automobile engine to the automobile frame or similar structure when the hood flap is in closed position. The invention is not only applicable to hood flaps or side leaves but also to other and various types of closure members.

The invention hereinafter described and claimed is an improvement upon the type of hood latch mechanism described and claimed in my copending application, Serial No. 733,882, filed August 25, 1924.

It is one of the objects of the invention to provide a strong, positively operating latch which may be made in various styles and designs at a relatively small manufacturing cost.

Another object is to provide a latch that will positively engage the hood flap and will prevent it from pulling or being jarred loose and from rattling.

Still another object is to provide means to guide the latch into locking position with the hood flap and means to securely position the latch when unlatched or unlocked. A further object is to provide means if and when necessary to antifrictionally engage the hood flap to yieldingly, but firmly hold the same against its abutment so that the flap may move vertically and longitudinally to a slight extent under varying conditions.

Further objects will become apparent from the description and claims and from the drawing in which, Fig. 1 is a transverse sectional view of a portion of an automobile hood flap with one form of my present invention applied thereto.

Fig. 2 is a modified type of bolt for the construction of Fig. 1,

Fig. 3 is a still further modification, and,

Fig. 4 is a section of the device shown in Fig. 3, taken on the line 4—4 thereof.

Adjacent an automobile hood flap 2, which may have a lug or boss 3 secured thereto by means of a rivet or other fastener 4 and which may be curled as shown at 5, is positioned a tubular latch guide member 6 secured in any suitable manner as by rivets or screws 7 to the automobile frame member or the like 8. Within the tubular member 6 and vertically slidable therein is a bolt member 9 provided with a handle 10 for displacement and a portion 11 bent around at any suitable angle, preferably about the angle shown in Figures 1 and 2 for engagement with a downwardly and outwardly projecting portion 12 of the lug 3 or with the exterior surface of the curled portion 5 of the hood flap. In some instances it may be preferable to form a slot in the hood flap for engagement by the latch lug. Upon the bent end of the bolt 9 a substantially heavy washer 13 is placed to serve as one abutment for a spring 14 at its other end abutting against the interior of the inturned end of the tubular guide 6. The abutment shown as a washer 13 may be a shell to inclose the end turns of the spring and if desired may be formed integrally with the bolt in any manner.

This tubular guide or casing 6 is slotted for a short distance circumferentially as shown at 15 to provide a step or shoulder upon which the bent portion of the bolt 9 may rest when it has been pulled upward against the action of the spring and turned out of a vertical slot 16 normally permitting the bolt to ride downward into engagement with the projecting portion of the hood flap.

The bolt 9 may be provided with an antifriction roller 17 internally packed with felt or other lubricant retaining material 18 or it may be formed as shown at 19 in Figure 2. In case the hood flap should tend to ride forwardly or rearwardly with movement of the vehicle to which it is attached, the roller will permit such movement to a slight degree while maintaining the flap tightly down in engagement with whatever abutting members may be chosen for it. Thus scratching of the surface of the lug 3 or the curled portion 5 of the hood may be entirely obviated.

From the foregoing, it should be apparent that by reason of the fixed relation of the bolt guide and securing means with respect to the hood flap or other closure member, the bent portion 11 of the bolt engages the surface of the projection 12 or the surface of the curled portion 5 of the hood flap, tangentially and with a camming or wedging action (the hood flap being prevented by its internal abutments from moving inwardly) to force the hood flap downwardly and inwardly into tight and relatively fixed engagement with its abutments. The relative positions of the various parts and their lengths, sizes, etc., may be so proportioned that the camming surface at 17 or 19 may engage the surface of the projecting portion 12 of the element 3 or the exterior surface of the curled portion 5 of the hood flap over a wide range of hood flap movement to thereby insure engagement of the latch with the hood under varying conditions.

When it is desired to unlatch the hood, it is merely necessary to pull upwardly on the handle 10 until the bent portion 11 is limited in its upward movement by the top of the slot 16, whereupon the bolt may be turned by the handle to move the bent portion into the slot 15 and out of registration with the slot 16. In this position, the bolt is held positively out of engagement with the hood flap, which may then be raised or lowered without interference with the latches.

In Figures 3 and 4, I have shown a slightly different type of construction from that of Figure 1 although the principles of operation and its functions are substantially the same. The sleeve member 20 in this instance is also rigidly secured to the frame member 21 of the automobile by means of rivets or screws 22, and is stepped to provide a shoulder 23 adapted to hold the bolt dog, or cam 24 out of engagement with the projecting portion 12 of the lug 3. The member 20 is slotted as shown at 25 to permit the dog or cam member 24 to be moved downward, under action of a spring 26, into engagement with the exterior surface of the projecting portion of the lug 3.

The dog 24 preferably forms a part of a sleeve member 27 which is preferably snugly but slidably contained within the sleeve 20 and is inwardly turned or flanged at its inner end as shown at 28 to provide an abutment and retaining means for the spring 26 abutting at its opposite end against a head 29 formed on an axial rod 30 rigidly secured in any suitable manner to the sleeve 20. A suitable handle 21 may be fixedly secured to the sleeve 27 in any preferred manner. When it is desired to disengage the dog 24 from the projection 12, it is merely necessary to raise the sleeve 27 against the action of the spring 26 by means of the handle 31 and turn it to a slight angle in either direction to cause the bottom face of the dog 24 to rest upon the shoulder 23.

From the foregoing it will be appreciated that I have provided a new and very useful device embodying in its broader features unique characteristics of function and operation, I do not, therefore, desire to be limited by the details of construction or the specific forms or modifications illustrated, but only by the spirit of my invention and the spirit of the appended claims.

I claim:

1. In combination with a closure member having a boss, a latch guide fixedly supported adjacent said member, a latch bolt supported by and slidable with respect to said guide, and a cam surface on said bolt adapted to engage said boss.

2. In combination with a closure member having a boss, a latch guide fixedly supported adjacent said member, a latch bolt slidable with respect to said guide and supported thereby, and a projection on said bolt adapted to tangentially engage said boss to force the same downwardly and inwardly.

3. In combination with a closure member having a boss, a latch guide fixedly supported adjacent said member, a latch bolt slidable with respect to said guide and supported thereby, a projection on said bolt adapted to tangentially engage said boss and means to resiliently urge said projection into engagement with said boss to force the same downwardly and inwardly.

4. In combination with a closure member having a boss, a latch guide rigidly supported adjacent said member, a latch bolt slidably engaged with said guide, and means on said bolt constructed and arranged to wedgingly engage said boss to force the same downwardly and inwardly.

5. In combination with a closure member having a boss, a fixed latch guide, and a bolt slidably secured in said guide and adapted to wedgingly engage said boss to force the same downwardly and inwardly.

6. In combination with an automobile hood having a depending flap with a latch engaging surface thereon, a latch support fixedly mounted adjacent said flap, a latch bolt slidably secured to said support, means normally urging said bolt downwardly, means connected with said bolt, to normally wedgingly engage said surface, and means whereby normal downward movement of said bolt may be arrested to force the same downwardly and inwardly.

7. In combination with an automobile hood having a depending flap with a projecting portion, a fixed latch support, a substantially vertically slidable bolt in said support, resilient means normally urging said bolt downward, and means connected with said bolt and cooperative with said flap projecting portion whereby said flap may be wedgingly engaged.

8. A latch for automobile hood flaps comprising, a latch guide and support adapted to be rigidly secured adjacent the hood flap, a bolt slidably engaged with said guide, and a cam acting projection on said bolt adapted to wedgingly engage an opposed surface on the flap to force the same downwardly and inwardly.

9. A latch for automobile hood flaps comprising, a latch guide and support adapted to be rigidly secured adjacent the hood flap, a bolt slidably engaged with said guide, means to resiliently urge said bolt toward said guide, and a cam acting projection on said bolt adapted to wedgingly engage a projection on the flap to force the same downwardly and inwardly.

10. A latch for automobile hood flaps comprising, a latch guide and support adapted to be rigidly secured adjacent the hood flap, a bolt slidably engaged with said guide, means on said bolt providing a cam surface adapted to wedgingly engage an opposed surface on the flap, and means whereby wedging movement of said bolt may be arrested to force the same downwardly and inwardly.

11. A latch for automobile hood flaps having a projection comprising, a latch guide adapted to be fixedly secured with respect to the flap, a latch bolt slidably secured to said guide, means connected with said bolt to normally wedgingly engage the flap, and anti-friction means adapted to be interposed between said wedgingly engaging means and the flap.

12. A latch of the character described comprising, a stationary guide, a latch member mounted so as to be capable of rotatable and longitudinally reciprocable movements in said guide and provided with a projection extending laterally beyond the guide, a spring normally urging said member downwardly in the guide, means for preventing rotary movement of said member when in operative position and means for preventing longitudinal movement of said member when in inoperative position.

13. An automobile hood latch comprising a fixedly mounted cylindrical guide provided with a longitudinally disposed guide slot and a shoulder adjacent to the upper end of said slot, a latch member mounted in said guide and provided with a hood holding portion projecting outwardly through said slot when in operative position, and a spring for urging said member downwardly in the guide, said member being adapted to be pulled upwardly against said spring and partially rotated to dispose said projection upon said shoulder whereby said member is retained in inoperative position.

14. An automobile hood latch comprising, a fixedly mounted guide provided with a longitudinal guide slot and a retaining shoulder at one side of said slot, a spring pressed latch member provided with a laterally projecting hood engaging portion, said portion being guided when in operative position by the walls of said slot and a handle whereby said latch member may be pulled upwardly and partially rotated to dispose said hood engaging portion upon said shoulder.

15. An automobile hood latch comprising, a stationary cylindrical guide member provided with a longitudinal slot and a shoulder at one side of said slot and a spring pressed latch member adapted to be held upon said shoulder in inoperative position and to be guided in operative position by said slot.

CHARLES B. GILMORE.